United States Patent
Al-Atat et al.

(10) Patent No.: US 9,553,484 B2
(45) Date of Patent: Jan. 24, 2017

(54) ELECTROHYDRAULIC GENERATOR SYSTEMS AND METHODS

(71) Applicant: Eaton Corporation, Cleveland, OH (US)

(72) Inventors: Hassan Al-Atat, Chaska, MN (US); Vishal Mahulkar, Eden Prairie, MN (US); Chad Larish, Minnetonka, MN (US)

(73) Assignee: Eaton Corporation, Cleveland, OH (US)

( * ) Notice: Subject to any disclaimer, the term of this patent is extended or adjusted under 35 U.S.C. 154(b) by 349 days.

(21) Appl. No.: 14/138,613

(22) Filed: Dec. 23, 2013

(65) Prior Publication Data

US 2015/0180281 A1 Jun. 25, 2015

(51) Int. Cl.
*H02J 9/08* (2006.01)
*H02K 7/18* (2006.01)
*F02B 63/04* (2006.01)
*H02J 9/06* (2006.01)
*H02J 15/00* (2006.01)

(52) U.S. Cl.
CPC .............. *H02J 9/08* (2013.01); *F02B 63/042* (2013.01); *H02J 9/061* (2013.01); *H02J 9/062* (2013.01); *H02J 15/003* (2013.01); *H02K 7/1815* (2013.01); *Y02E 60/17* (2013.01); *Y02P 80/11* (2015.11); *Y10T 307/625* (2015.04); *Y10T 307/636* (2015.04)

(58) Field of Classification Search
CPC ...................................................... H02J 3/005
USPC ............................................................ 307/64
See application file for complete search history.

(56) References Cited

U.S. PATENT DOCUMENTS

| | | | |
|---|---|---|---|
| 4,827,152 A * | 5/1989 | Farkas | H02J 9/066 290/4 R |
| 5,373,198 A | 12/1994 | Lopez Jimenez | |
| 2005/0188689 A1 | 9/2005 | Juby et al. | |

FOREIGN PATENT DOCUMENTS

| EP | 0 939 477 A1 | 9/1999 |
|---|---|---|
| WO | WO 2012/102654 A1 | 8/2012 |

OTHER PUBLICATIONS

Notification of Transmittal of The International Search Report and the Written Opinion of the International Searching Authority, or the Declaration, PCT/US2014/070452, Date of Mailing: Apr. 7, 2015, 12 pages.
International Preliminary Report on Patentability Corresponding to International Application No. PCT/US2014/070452; Date of Mailing: Jul. 7, 2016; 8 Pages.

* cited by examiner

*Primary Examiner* — Robert Deberadinis
(74) *Attorney, Agent, or Firm* — Myers Bigel, P.A.

(57) ABSTRACT

A system includes a generator configured to be coupled to a power input of an uninterruptible power supply (UPS), an engine, a hydraulic motor and a mechanical coupling mechanism configured to selectively couple the engine and the hydraulic motor to the generator. The system further includes a hydraulic accumulator and a valve configured to fluidically couple the hydraulic accumulator to the hydraulic motor. A control circuit is configured to control the valve, the mechanical coupling mechanism and the engine in conjunction with the UPS to supply power to the UPS.

22 Claims, 9 Drawing Sheets

ELECTROHYDRAULIC GENERATOR SYSTEMS AND METHODS

BACKGROUND

The inventive subject matter relates to power supply apparatus and methods and, more particularly, to generator systems and methods.

UPS systems are commonly used in commercial and industrial facilities, such as data centers, telecommunications facilities, factories and hospitals. They are often used to provide reliable, high quality power to critical equipment, such as computer systems.

UPS systems typically include one or more batteries, which are used to provide power to critical equipment when a primary utility power source fails. Batteries generally have high energy density, which can enable them to provide power for extended time periods. However, batteries may be expensive to purchase and maintain. They typically require frequent maintenance, may have a relatively short life and it may be difficult to accurately determine their state of health. Batteries may also need controlled environmental conditions, which may restrict their application.

A large number of data centers and other installations now use local backup generator sets (e.g., diesel-electric generator sets) to provide extended backup power. However, such generator sets typically require significant time to start up and stabilize before their power output is of sufficient quality to serve the load. Because of this delay, such installations still typically use battery-based UPSs to provide backup power after a utility failure until the output of the backup generator set stabilizes.

SUMMARY

Some embodiments of the inventive subject matter provide a system including a generator configured to be coupled to a power input of an uninterruptible power supply (UPS), an engine, a hydraulic motor and a mechanical coupling mechanism configured to selectively couple the engine and the hydraulic motor to the generator. The system further includes a hydraulic accumulator and a valve configured to fluidically couple the hydraulic accumulator to the hydraulic motor. A control circuit is configured to control the valve, the mechanical coupling mechanism and the engine in conjunction with the UPS to supply power to the UPS.

In some embodiments, the control circuit may be configured to selectively drive the generator using the hydraulic accumulator and the engine responsive to a status of a power source coupled to the UPS. For example, the control circuit may be configured to sequentially drive the generator using the hydraulic accumulator and the engine responsive to a failure of the power source. The control circuit may also be configured to cause the hydraulic motor to drive the engine. The mechanical coupling mechanism may include at least one clutch controlled by the control circuit.

According to some embodiments, the generator may include a reversible motor/generator and the hydraulic pump may include a reversible motor/pump. The control circuit may be configured operate the motor/generator and the motor/pump to charge the hydraulic accumulator.

Some embodiments of the inventive subject matter provide a power supply system including a UPS and an electrohydraulic generator system coupled to a power input of the UPS. The electrohydraulic generator system includes an engine and a hydraulic accumulator and is configured to selectively provide power to the UPS from the engine and the hydraulic accumulator responsive to a state of the UPS. The electrohydraulic generator system may be configured to selectively provide power to the UPS from the engine and the hydraulic accumulator responsive to a state of a power source coupled to the UPS.

Still further embodiments provide methods of operating a power supply system. The methods include providing power to a load from a primary power source via a UPS and selectively providing power to the load from an engine and a hydraulic accumulator via the UPS responsive to a state of the UPS. Selectively providing power to the load from an engine and a hydraulic accumulator via the UPS responsive to a state of the UPS may include selectively driving a generator coupled to the UPS using the hydraulic accumulator and the engine.

DETAILED DESCRIPTION

Figure 1:
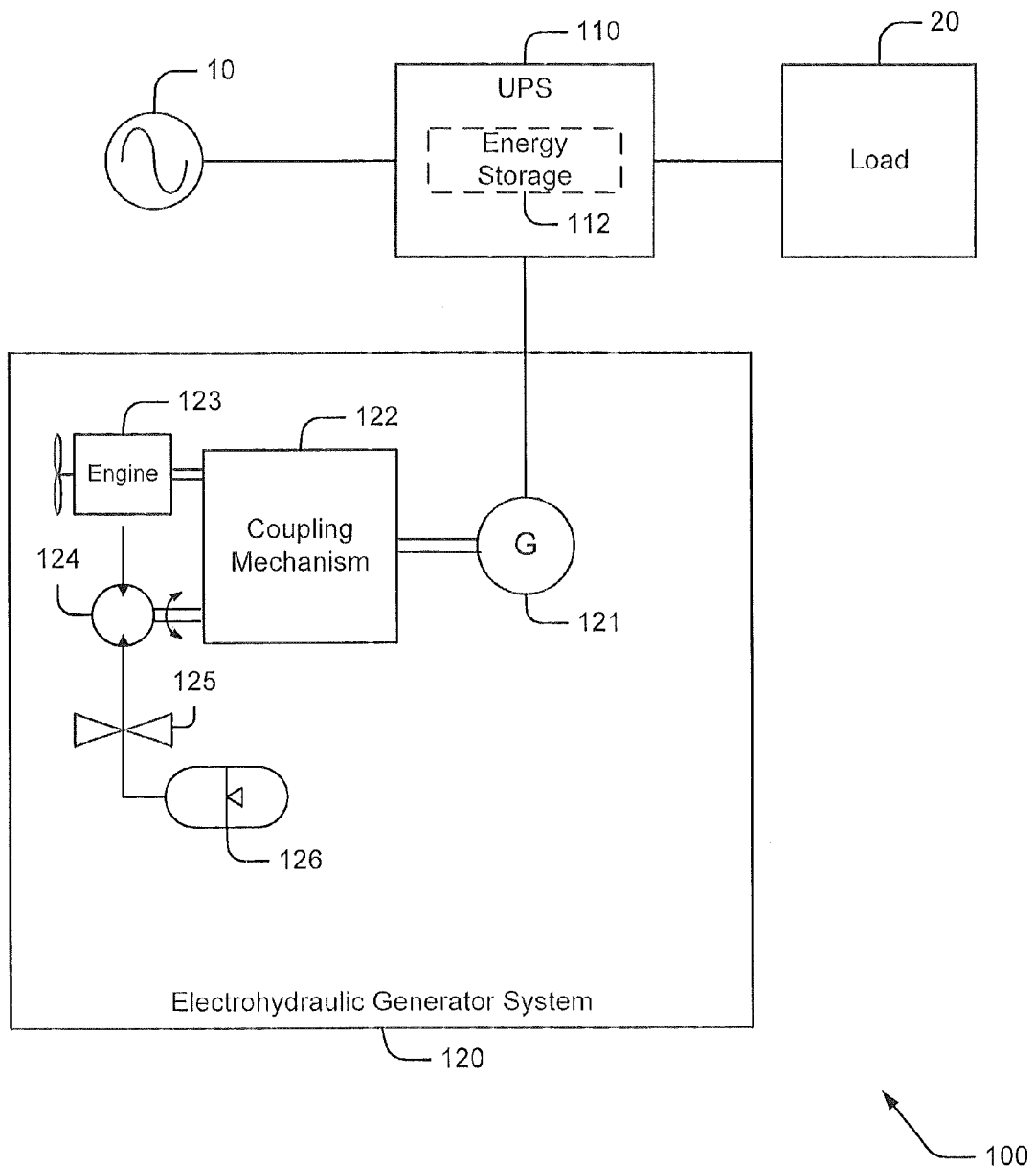
FIG. 1 is a schematic diagram illustrating a power supply system with an electrohydraulic generator system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a power supply system 100 according to some embodiments of the inventive subject matter. The system 100 includes a UPS 110, which is configured to receive power from an AC power source 10 and to supply power to a load 20. The power source 10 may include, for example, a utility power source. The system further includes an electrohydraulic generator system 120, which is configured to provide energy to the UPS 110 as an auxiliary to the power source 10. The electrohydraulic generator system 120 includes a hydraulic accumulator 126, which is configured to store energy that is delivered to the UPS 110 via a hydraulic motor 124 and a generator 121 driven by the motor 124 via a coupling mechanism 122. Fluid may be delivered from the hydraulic accumulator 126 to the motor 124 under control of a valve 125. The hydraulic accumulator 126 may take any of a variety of different forms, such as compressed gas accumulators employing bladders or pistons. The electrohydraulic generator system 120 further includes an engine 123 (e.g., a diesel engine, gas turbine or the like), which is configured to also drive the generator 121 via the coupling mechanism 122. In particular, the coupling mechanism 122 may selectively drive the generator 121 (e.g., using gearboxes, clutches and the like) with the hydraulic motor 125 and the engine 123.

In some embodiments, the hydraulic motor 124 may be a reversible motor/pump and may be used to charge the accumulator 126. In some embodiments, such a reversible motor/pump may be driven by the engine 123 via the coupling mechanism 122 and/or the generator 121 may be a reversible motor/generator that may be powered from the UPS 110 and/or the power source 10 and drive the motor/pump to recharge the accumulator 126. In some embodiments, the accumulator 126 may be charged by an ancillary pump powered from the power source 10 and/or other power sources.

According to some embodiments, the UPS 110 may be configured to receive energy from the electrohydraulic generator system 120 when the power source 10 experiences a failure condition, such as an outage. For example, as explained in greater detail below, the coupling mechanism 122 may sequentially couple the hydraulic motor 124 and the engine 123 to the generator 121 to provide power to the UPS 110 in response to an outage of the power source 10. The electrohydraulic generator system 120 may maintain power at the load 20 until the power source 10 returns to a nominal state. As shown in FIG. 1, the UPS 110 may further include (or be connected to) additional energy storage device 112, such as storage system using batteries, capacitors, supercapacitors and/or ultracapacitors. The energy storage device 112 may be used to bridge between the primary power source 10 and the electrohydraulic generator system 120 or otherwise used in conjunction with the electrohydraulic generator system 120.

It will be appreciated that the UPS 110 may take different forms, including, but not limited to, double-conversion, standby, line interactive, delta conversion and hybrid configurations. The electrohydraulic generator system 120 may be interfaced to the UPS 110 in any of a number of different ways, e.g., via an AC input or a DC input. The electrohydraulic generator system 120 may be partially or fully integrated with the UPS 110 and/or may be a standalone system that operates in coordination with the UPS 110, with or without control signaling therewith.

Figure 2:
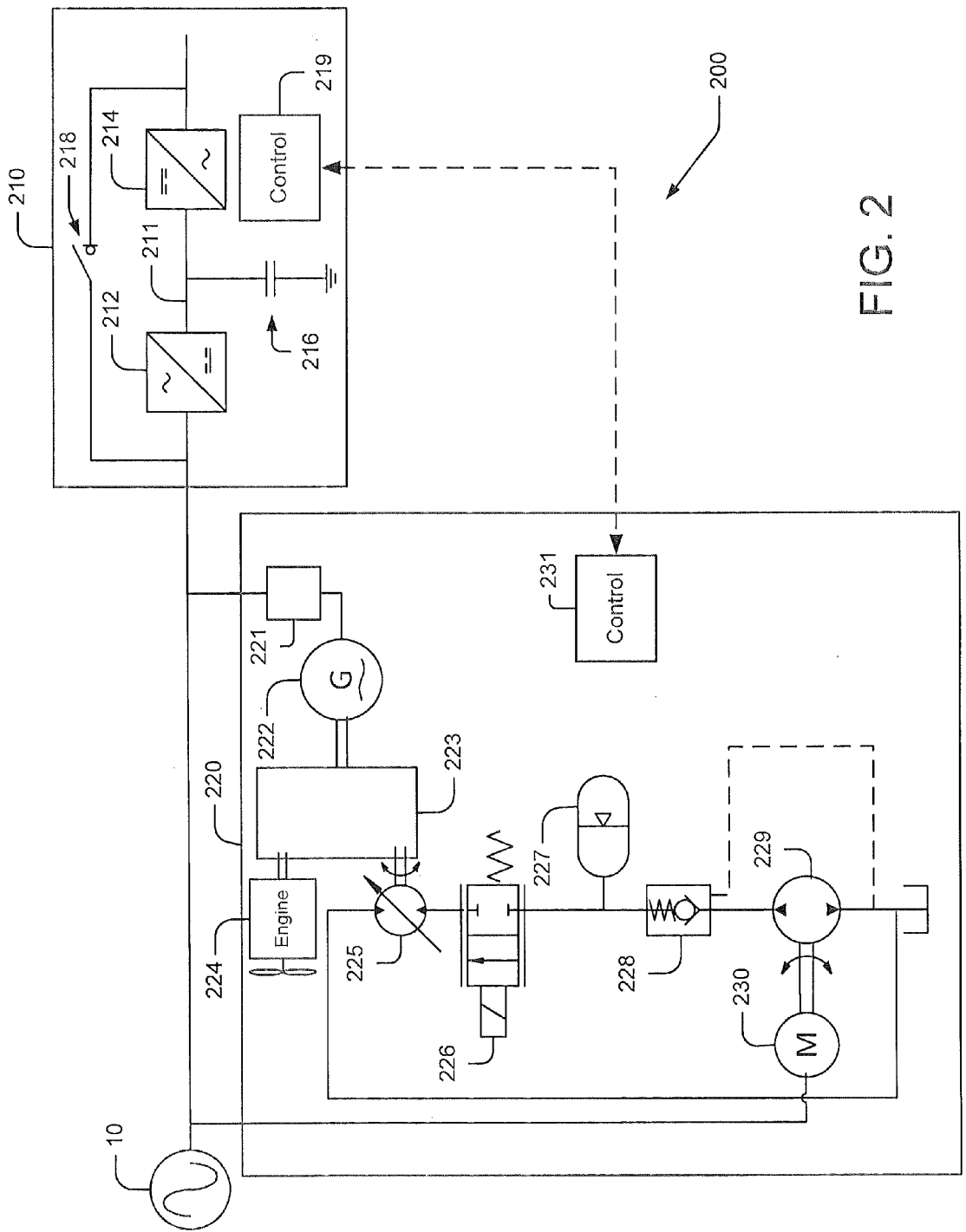
FIG. 2 is a schematic diagram illustrating a power supply system with an electrohydraulic generator system interfaced at an AC input of a double conversion UPS according to some embodiments.

FIG. 2 illustrates a power supply system 200 according to some embodiments. The system 200 includes an online double conversion UPS 210, which is configured to receive power from a primary power source 10 (e.g., a utility source). The UPS 210 includes a double conversion chain including a rectifier 212 and an inverter 214 linked by a DC bus 211. An energy storage device, here shown as a capacitor system 216, is coupled to the DC bus 211. The capacitor system 216 may include, for example, electrolytic storage capacitors, supercapacitors and/or ultracapacitors, directly coupled to the DC bus 211 or interfaced thereto using, for example, switching and/or converter circuitry. The UPS 210 may further include a bypass 218, which may be used to bypass the rectifier 212 and the inverter 214 in event of failure thereof, to support maintenance operations on the rectifier 212 and/or inverter 214 and/or to support certain operational modes, such as high-efficiency modes that directly couple the power source 10 to a load to avoid incurring losses from the rectifier 212 and inverter 214 of the UPS 210. A control circuit 219 may control the rectifier 212, inverter 214, capacitor system 216, bypass 218 and/or other components of the UPS 210.

The system 200 further includes an electrohydraulic generator system 220 coupled to an AC input of the UPS 210. The electrohydraulic generator system 220 includes an AC generator 222, which may be interfaced to the AC input of the UPS 210 by an interface circuit 221 including switches, converter circuitry and/or other components. The generator 222 is selectively driven by a hydraulic motor 225 and an engine 224 via a coupling mechanism 223. The coupling mechanism 223 may include, for example, clutches to engage and disengage the engine 224 and the hydraulic motor 225, along with gears (e.g., a differential gear box) through with the engine 223 and the hydraulic motor 225 may drive the AC generator 222.

The hydraulic motor 225 is powered by a hydraulic accumulator 227 via an electro-hydraulic valve 226. The accumulator 227 is charged via a non-return valve 228 by a hydraulic pump 229 driven by an electric motor 230. The pump motor 230 may be powered by the AC power source 10 that is coupled to the UPS 210, but it will be appreciated that the motor 230 may be driven by a different power source. The electrohydraulic generator system 220 further includes a control circuit 231 configured to control the generator 222, coupling mechanism 223, engine 224, valve 227, motor 228 and/or other components of the electrohydraulic generator system 220. The electrohydraulic generator system 220 may be integrated with the UPS 210 in a common assembly with common control circuitry (e.g., a common control processor) or may be provided as a separate assembly.

In some embodiments, the electrohydraulic generator system 220 may be configured to operate responsive to a state of the UPS 210. For example, control signals may pass between the control circuit 219 of the UPS 210 and the control circuit 231 of the electrohydraulic generator system 220 to coordinate operations of the UPS 210 and the electrohydraulic generator system 220. Such signaling may, for example, support coordinated operation of the UPS 210 and the electrohydraulic generator system 220 such that, upon loss of the primary power source 10, the load served by the UPS 210 is first supported by energy stored in the capacitor system 216 until such time as power from the electrohydraulic generator system 420 becomes available. The electrohydraulic generator system 220 may drive the AC generator 222 with the hydraulic motor 225 responsive to the outage to provide power until the engine 224 can be started and engaged to drive the generator 222. In some cases, outages of a sufficiently short duration may be handled solely the by the energy stored in the accumulator 227, thus avoiding the need to start and engage the engine 224.

In further embodiments, the hydraulic system 220 may be controlled independently from the UPS 210. For example, the electrohydraulic generator system 210 may activate responsive to the state of the primary power source 10, e.g., the electrohydraulic generator system 220 may spin up upon detecting an outage of the primary power source 10 and may power off upon restoration of the primary power source 10. In such an arrangement, the UPS 210 may act to transitionally provide power using energy stored in the capacitor system 216 until power from the electrohydraulic generator system 220 becomes available. The nature and capacity of the capacitor system 216 may depend on the speed at which the electrohydraulic generator system 220 can produce an acceptable output. When providing power to the load from the electrohydraulic generator system 220, power may be routed through the rectifier 212 and inverter 214 and/or through the bypass 218.

In operations according to some embodiments, the UPS 210 and/or the electrohydraulic generator system 220 may detect an outage of the primary power source 10 and responsively initiate fluid transfer from the accumulator 227 to the hydraulic motor 225, causing power to flow from the electrohydraulic generator system 220 to the rectifier 212 of the UPS 210. In the period before the output of the AC generator 222 is of a sufficient quality to maintain the load, the UPS 210 may continue to serve the load using energy stored in the capacitor system 216. The primary power source 10 may return a sufficient time before exhaustion of the energy stored in the accumulator 227, thus obviating the need to start the engine 224. If the primary power source 10 is not restored within a sufficient time, however, the engine 224 may be started and engaged to drive the AC generator 222 to provide power for a sustained interval. Upon return of the primary power source 10, the generator 222 may be taken off line and the engine 224 stopped. The control circuitry of the UPS 210 and/or the electrohydraulic generator system 220 may operate the motor 230 from the primary power source 10 to recharge the accumulator 227.

Figure 3:
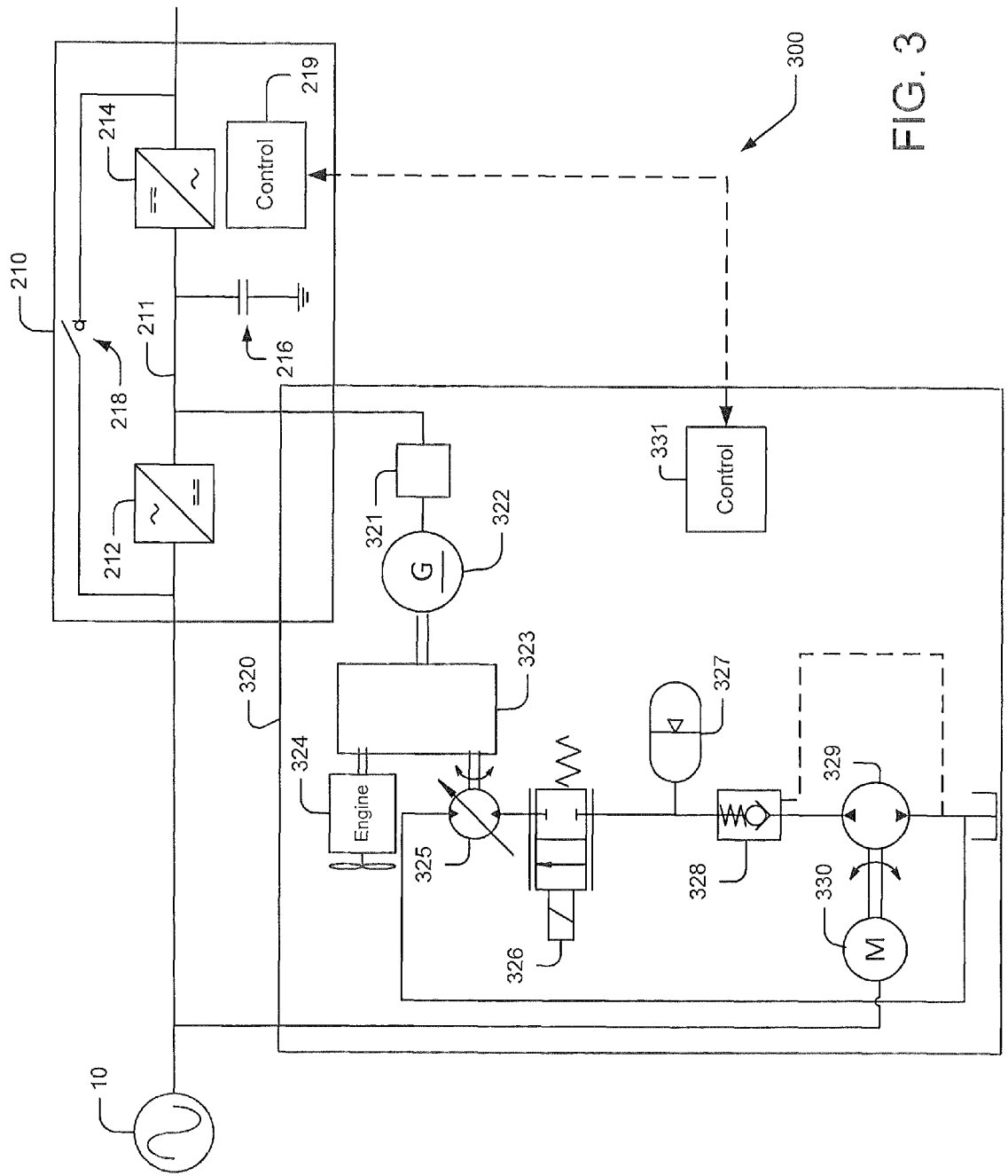
FIG. 3 is a schematic diagram illustrating a power supply system with an electrohydraulic generator system interfaced at a DC input of a double conversion UPS according to some embodiments.

According to further embodiments, an electrohydraulic generator system may be interfaced to a UPS in other ways. For example, FIG. 3 illustrates a power supply system 300 including an online double conversion UPS 210 which is configured along the lines described above with reference to FIG. 2. The system 300 further includes an electrohydraulic generator system 320 interfaced to the DC bus 211 of the UPS 210. The electrohydraulic generator system 320 includes a DC generator 322, which may be interfaced to the DC bus 211 of the UPS 210 using an interface circuit 321 that includes switches, converter circuitry and/or other components. The generator 322 is selectively driven by an engine 324 and a hydraulic motor 323 via a coupling mechanism 323.

The hydraulic motor 325 is powered by a hydraulic accumulator 327 via an electro-hydraulic valve 326. The accumulator 327 is charged via a non-return valve 328 by a hydraulic pump 329 driven by an electric motor 330. The pump motor 330 may be an AC motor powered by the AC power source 10 that is coupled to the UPS 210, but it will be appreciated that the motor 330 may be driven by a different power source, such as the DC bus 211 of the UPS 210. The electrohydraulic generator system 320 further includes a control circuit 331 configured to control the generator 322, coupling mechanism 323, engine 324, valve 326, motor 330 and/or other components of the electrohydraulic generator system 320. The electrohydraulic generator system 320 may be integrated with the UPS 210 in a common assembly with common control circuitry, or may be provided as a separate assembly.

In some embodiments, the electrohydraulic generator system 320 may be configured to operate responsive to a state of the UPS 210. For example, control signals may pass between the control circuit 219 of the UPS 210 and the control circuit 331 of the electrohydraulic generator system 320 to coordinate operations of the UPS 210 and the electrohydraulic generator system 320. Such signaling may, for example, support coordinated operation of the UPS 210 and the electrohydraulic generator system 320 such that, upon loss of the primary power source 10, the load served by the UPS 210 is first supported by energy stored in the capacitor system 216 until such time as power from the electrohydraulic generator system 320 becomes available. Power provided by the electrohydraulic generator system 320 may be transferred to the load via the inverter 214 of the UPS 210.

According to some embodiments, the UPS 210 and/or the electrohydraulic generator system 320 may detect an outage of the primary power source 10 and responsively initiate fluid transfer from the accumulator 327 to the hydraulic motor 325, causing power to flow from the electrohydraulic generator system 320 to the DC bus 211 of the UPS 210. Until the DC generator 322 begins to provide sufficient power to maintain the load, the UPS 210 may continue to serve the load using energy stored in the capacitor system 216. If the primary power source 10 is not restored within a sufficient time, the engine 324 may be started and engaged to drive the DC generator 322 to provide power for a an extended period. Upon return of the primary power source 10, the generator 322 may be taken off line and the engine 324 stopped. After return of the primary power source 10, the control circuitry of the UPS 210 and/or the electrohydraulic generator system 320 may operate the motor 330 from the primary power source 10 to recharge the accumulator 327.

Figure 4:
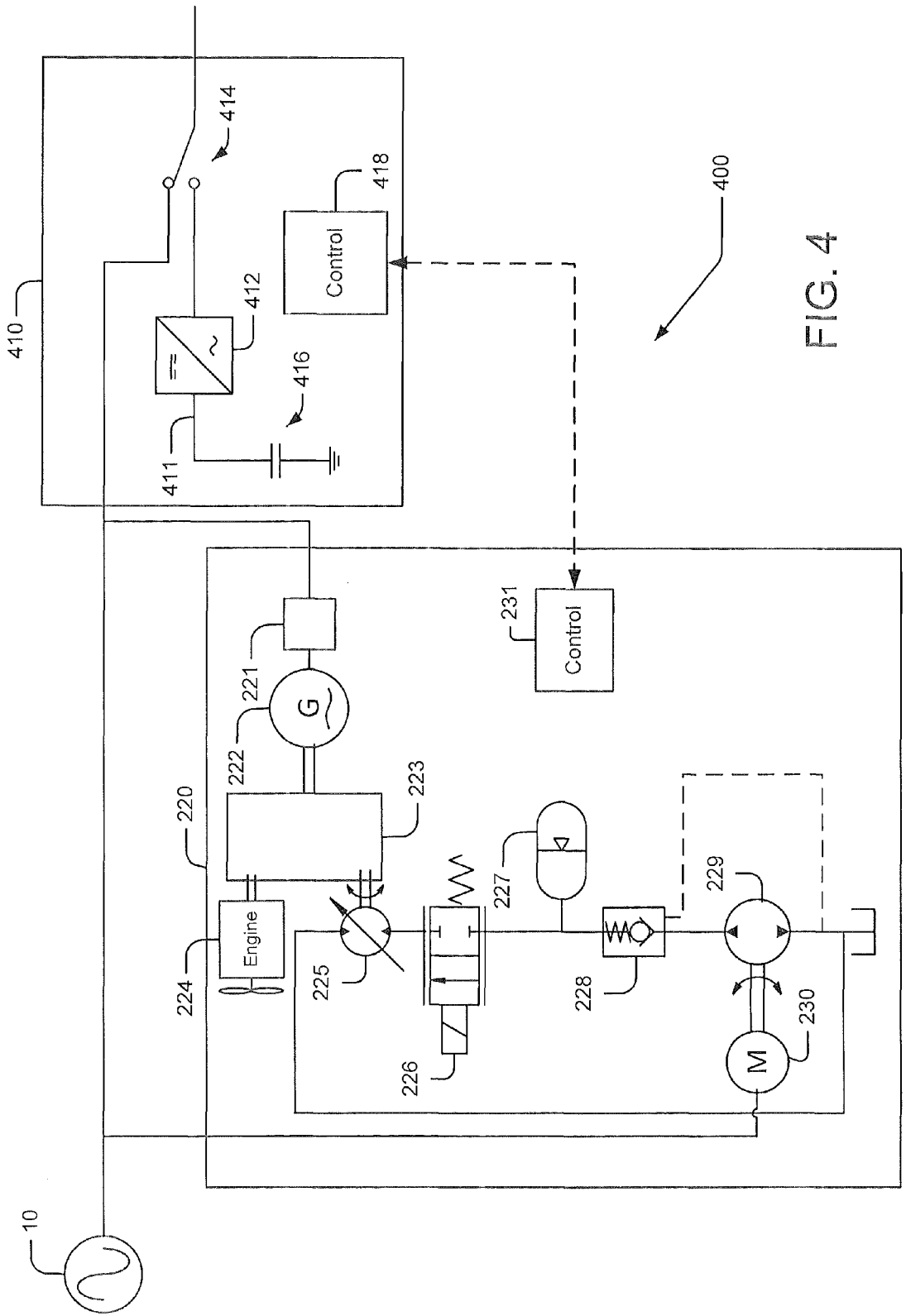
FIG. 4 is a schematic diagram illustrating a power supply system with an electrohydraulic energy generator system interfaced at an AC input of a standby UPS according to some embodiments.

Embodiments of the inventive subject matter may employ other types of UPSs. For example, FIG. 4 illustrates a power supply system 400 that includes a standby UPS 410 configured to receive power from a primary power source 10. The UPS 410 includes an inverter 412 configured to receive power from an energy storage device, here shown as a capacitor system 416, coupled to a DC bus 411. The UPS 410 includes a switch 414 configured to selectively couple the primary power source 10 and an output of the inverter 412 to a load. A control circuit 418 may control operations of the inverter 412, the capacitor system 416 and the switch 414.

The system 400 further includes an electrohydraulic generator system 220 along the lines described above with reference to FIG. 2. The electrohydraulic generator system 420 may be configured to operate responsive to a state of the UPS 410. For example, control signals may pass between the control circuit 418 of the UPS 410 and the control circuit 231 of the electrohydraulic generator system 220 to coordinate operations of the UPS 410 and the electrohydraulic generator system 420. Such signaling may, for example, support coordinated operation of the UPS 410 and the electrohydraulic generator system 220 such that, upon loss of the primary power source 10, the load served by the UPS 410 is first supported by energy stored in the capacitor system 216 until such time as power from the electrohydraulic generator system 220 becomes available. In further embodiments, the hydraulic system 220 may be controlled independently from the UPS 410. For example, the electrohydraulic generator system 220 may activate responsive to the state of the primary power source 10.

The UPS 410 and/or the electrohydraulic generator system 220 may detect an outage of the primary power source 10, e.g., a failure of a utility power source, and responsively initiate fluid transfer from the accumulator 227 to the hydraulic motor 225, causing power to flow from the electrohydraulic generator system 220 to the UPS 410. Until the output of the AC generator 222 is sufficient to maintain the load, the UPS 410 may continue to serve the load using energy stored in the capacitor system 416. If the primary power source 10 is not restored within a sufficient time, the engine 224 may be started and engaged to drive the AC generator 222 to provide power for a sustained interval. Upon return of the primary power source 10, the generator 222 may be taken off line and the engine 224 stopped. The control circuitry of the UPS 410 and/or the electrohydraulic generator system 220 may operate the motor 230 from the primary power source 10 to recharge the accumulator 227.

In further embodiments, the electrohydraulic generator system 220 may also be used to provide power for conditioning the output of the UPS 410 when operating on the primary power source 10. In particular the UPS 410 may be configured to concurrently couple the inverter 412 and the primary power source 10 to the load. The inverter 412 may be operated to provide, for example, reactive power and/or harmonic current compensation using energy provided by the electrohydraulic generator system 220.

Figure 5:
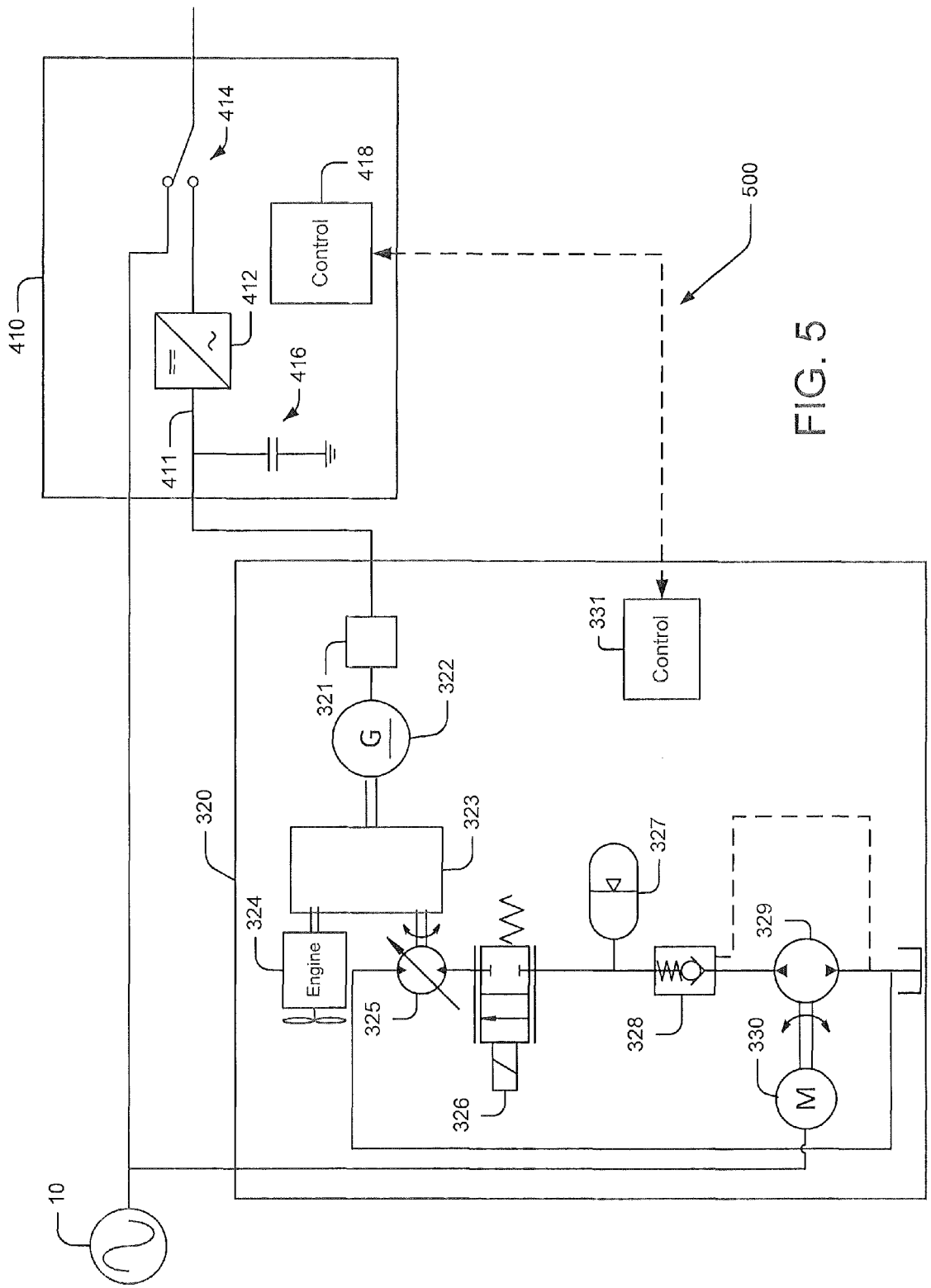
FIG. 5 is a schematic diagram illustrating a power supply system with an electrohydraulic generator system interfaced at a DC input of a standby UPS according to some embodiments.

FIG. 5 illustrates a power supply system 500 according to some embodiments. The system 500 includes a standby UPS 410 including components as described above with reference to FIG. 4. The system 500 further includes an electrohydraulic generator system 320 having a configuration along the lines described above with reference to FIG. 3 and coupled to the DC bus 411 of the UPS 410.

In some embodiments, the electrohydraulic generator system 320 may be configured to operate responsive to a state of the UPS 410. For example, control signals may pass between the control circuit 418 of the UPS 410 and the control circuit 331 of the electrohydraulic generator system 320 to coordinate operations of the UPS 410 and the electrohydraulic generator system 320.

In some embodiments, the UPS 410 and/or the electrohydraulic generator system 320 may detect an outage of the primary power source 10 and responsively operate the switch 414 to allow the inverter 412 to power the load from the capacitor system 416 while concurrently initiate fluid transfer from the accumulator 527 to the hydraulic motor 525. Until the output of the DC generator 322 is sufficient to maintain the load, the UPS 410 may continue to serve the load using energy stored in the capacitor system 416. If the primary power source 10 is not restored within a sufficient time, the engine 324 may be started and engaged to drive the AC generator 322 to provide power for an extended period. Upon return of the primary power source 10, the generator 322 may be taken off line and the engine 324 stopped. The control circuitry of the UPS 410 and/or the electrohydraulic generator system 320 may operate the motor 330 from the primary power source 10 to recharge the accumulator 327.

Figure 6:
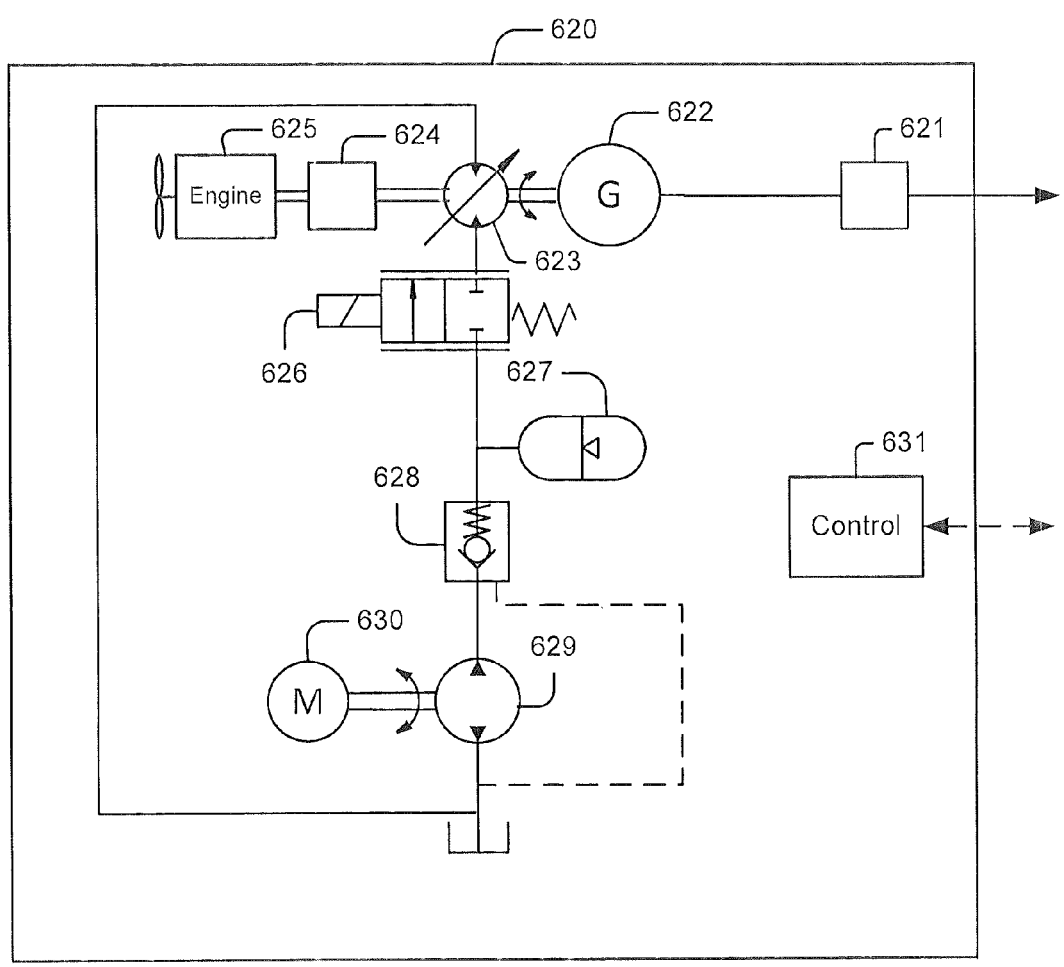
FIG. 6 is a schematic diagram illustrating an electrohydraulic generator system according to further embodiments.

In further embodiments, different mechanical coupling arrangements for engines and hydraulic motors may be used. For example, FIG. 6 illustrates an electrohydraulic generator system 620, which includes a generator 622 configured to be coupled to a UPS via coupling circuitry 621. The generator 622 is configured to driven by a hydraulic motor 623 and/or an engine 625 via a common shaft. The engine 625 may be mechanically coupled to the generator 622 using a coupling mechanism 624, which may include, for example, a clutch operative to engage and disengage the engine 625. The coupling mechanism 624 may include additional mechanical components, such as gears for providing a desired transfer relationship between the engine 625 and the generator 622 and/or hydraulic motor 623.

The hydraulic motor 623 is configured to be driven by a fluid in a hydraulic accumulator 627 via an electrohydraulic valve 626. The hydraulic accumulator 627 is charged by a pump 629 via a non-return valve 628. An electric motor 630 drives the pump 629. A control circuit 631 may control the interface circuit 621, generator 622, coupling mechanism 624, engine 625, valve 626 and motor 629.

Figure 7:
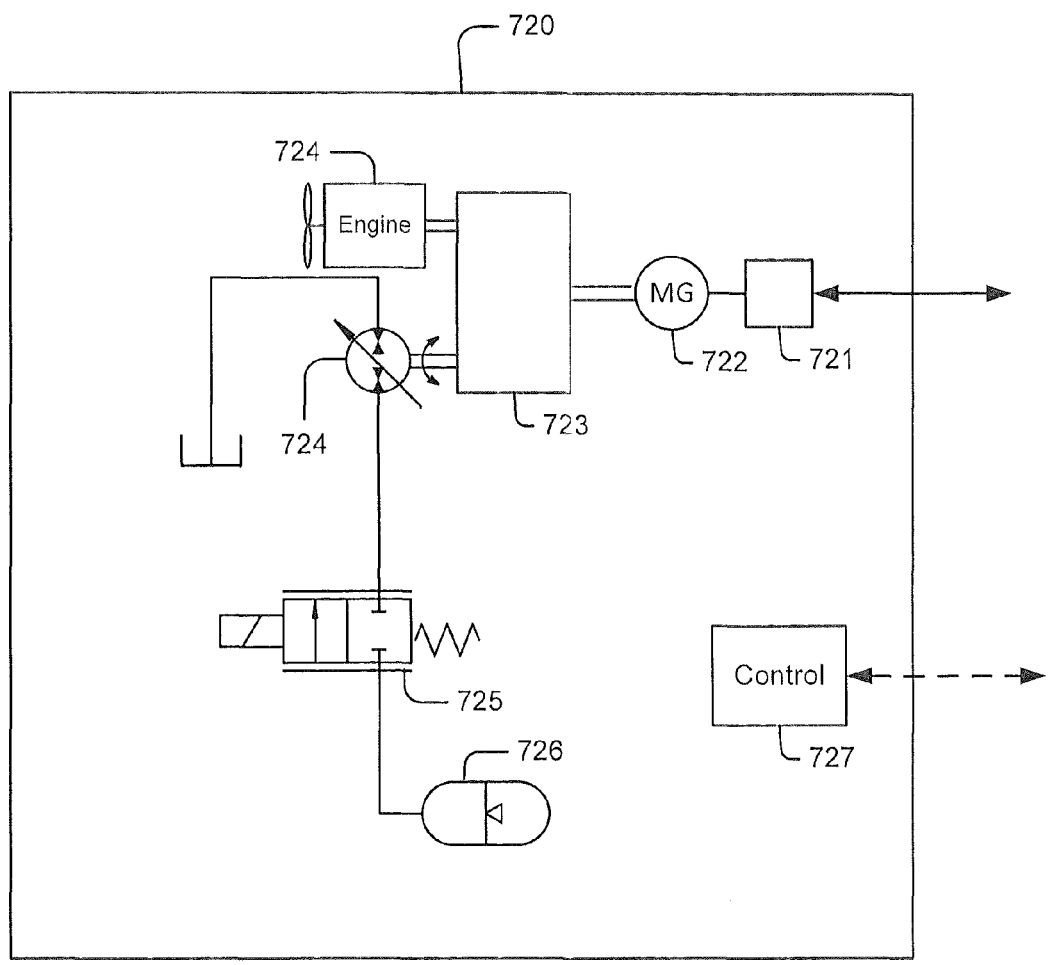
FIG. 7 is a schematic diagram illustrating a reversible electrohydraulic generator system according to some embodiments.

According to further embodiments, electrohydraulic generator systems may include reversible electrohydraulic systems that can eliminate the need for separate motors, generators and pumps. FIG. 7 illustrates an electrohydraulic generator system 720 configured to be coupled to an input of a UPS. The electrohydraulic generator system 720 includes a motor/generator 722 coupled to the AC input of the UPS 210 by an interface circuit 721, which may include switches and/or converter circuitry. The motor/generator 722 is selectively coupled to a hydraulic motor/pump 724 and an engine 724 via a coupling mechanism 723. The hydraulic pump/motor 724 is fluidically coupled to a hydraulic accumulator 726 via an electro-hydraulic valve 725. Energy stored in the hydraulic accumulator 725 may be used to drive the hydraulic motor/pump 724 as a motor to operate the motor/generator 722 to provide power to the attached UPS. The hydraulic motor/pump 724 may also drive the engine 724 via the coupling mechanism 723 to assist starting of the engine 724. Once started and stabilized, the engine 724 may be used drive the motor/generator 722 via the coupling mechanism 723 to provide power for an extended period. To recharge the accumulator 726, the motor/generator 722 may be operated as a motor to drive the hydraulic motor/pump 724 via the coupling mechanism 723. The electrohydraulic generator system 720 further includes a control circuit 727 configured to control the motor/generator 722, engine 725, coupling mechanism 724, valve 726 and/or other components of the electrohydraulic generator system 720. The electrohydraulic generator system 720 may be integrated with a UPS in a common assembly with common control circuitry, or may be provided as a separate assembly.

Figure 8:
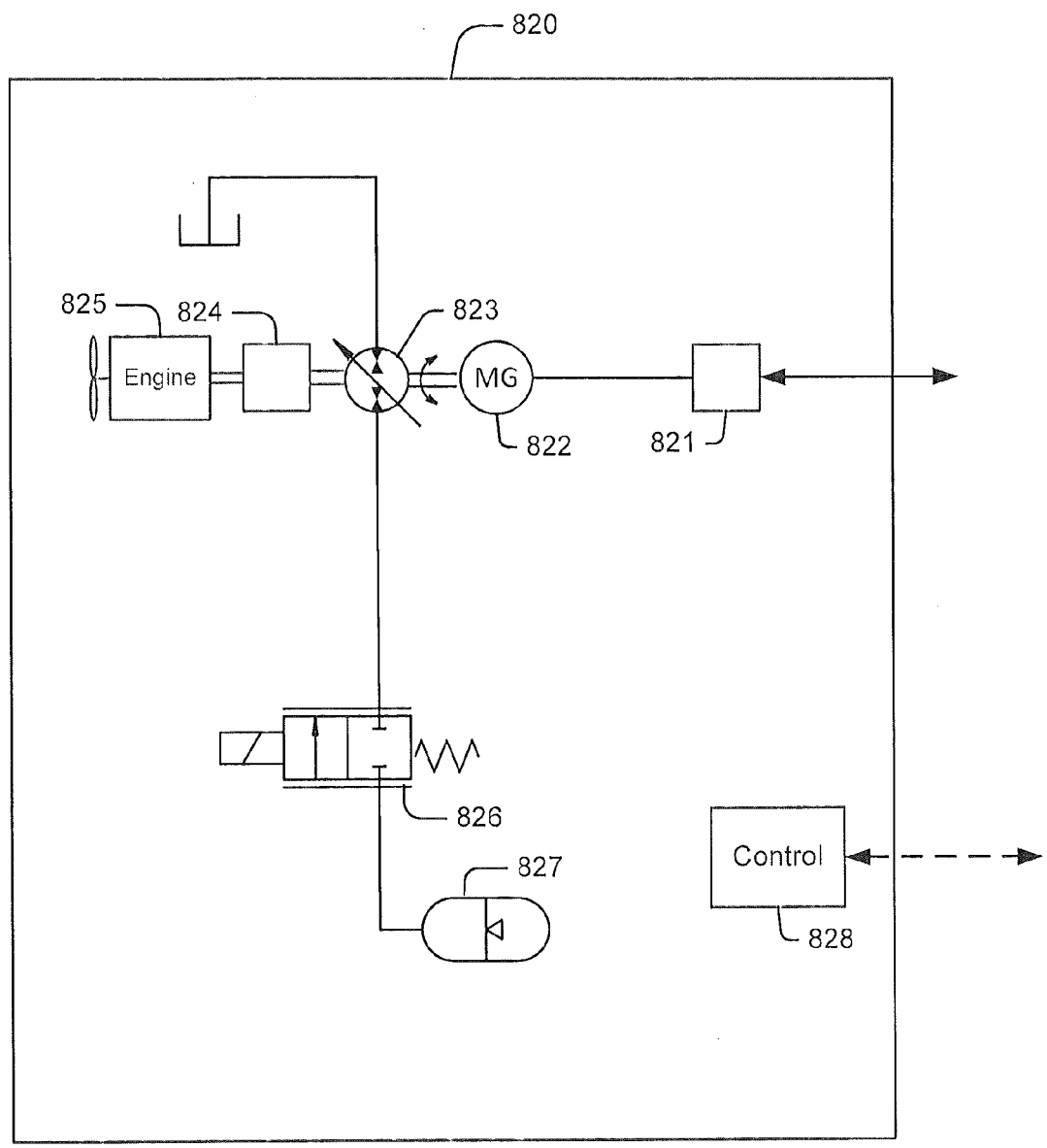
FIG. 8 is a schematic diagram illustrating a reversible electrohydraulic generator system according to further embodiments.

FIG. 8 illustrates an electrohydraulic generator system 820 with a different mechanical configuration. The electrohydraulic generator system 820 includes a motor/generator 822 coupled to an input of a UPS by an interface circuit 821. The motor/generator 822 may be driven by an engine 825 and/or a hydraulic motor/pump 823 coupled to a common shaft. The engine 825 may be coupled to the hydraulic motor/pump 823 and the motor/generator by a coupling mechanism 824, which may include clutches, gears and the like. The hydraulic pump/motor 823 is fluidically coupled to a hydraulic accumulator 827 via an electrohydraulic valve 826. Energy stored in the hydraulic accumulator 827 may be used to drive the hydraulic motor/pump 823 as a motor to operate the motor/generator 822 to provide power to the attached UPS. The hydraulic motor/pump 823 may also drive the engine 825 to assist in starting. Once started and stabilized, the engine 825 may be used drive the motor/generator 822 to provide power for an extended period. To recharge the accumulator 827, the motor/generator 822 may be operated as a motor to drive the hydraulic motor/pump 823. The electrohydraulic generator system 820 further includes a control circuit 828 configured to control the interface circuit 821, motor/generator 822, engine 825, coupling mechanism 824, valve 826 and/or other components of the electrohydraulic generator system 820. The electrohydraulic generator system 820 may be integrated with a UPS in a common assembly with common control circuitry, or may be provided as a separate assembly.

Figure 9:
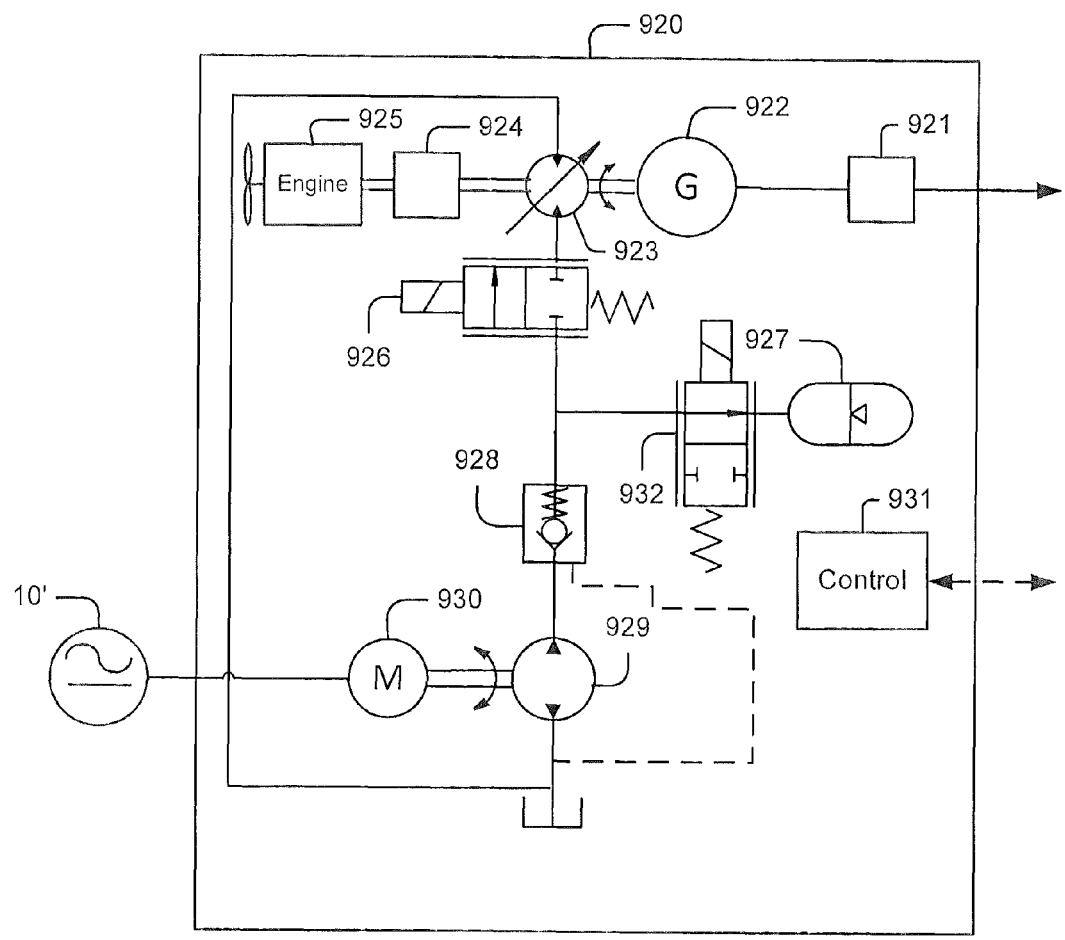
FIG. 9 is a schematic diagram illustrating an electrohydraulic generator system according to further embodiments.

According to still further embodiments, an electrohydraulic generator system may be used as a power converter to, for example, interface power systems. For example, FIG. 9 illustrates an electrohydraulic generator system 920, which includes a generator 922 configured to be coupled to a load (e.g., a UPS and/or other electrical load) via coupling circuitry 921. The generator 922 is configured to driven by a hydraulic motor 923 and/or an engine 925 via a common shaft. The engine 925 may be mechanically coupled to the generator 922 using a coupling mechanism 924, which may include, for example, a clutch operative to engage and disengage the engine 925. The coupling mechanism 924 may include additional mechanical components, such as gears for providing a desired transfer relationship between the engine 925 and the generator 922 and/or hydraulic motor 923.

The hydraulic motor 923 is configured to be driven from a hydraulic accumulator 927 and/or a hydraulic pump 929 via valves 926, 928, 932. An electric motor 930 drives the pump 929. The motor 930 may be driven by a power source 10', which may provide AC and/or DC power. The power source 10' may, for example, have a different frequency (AC or DC) and/or voltage than the frequency and/or voltage of an output produced by the generator 922, and the hydraulic drive train may be used to provide power transfer between the dissimilar electrical domains. The hydraulic accumulator 927 may also be charged by the pump 929, and may be used, for example, to provide backup power in the event of loss of the power source 10' and/or to smooth variations in power from the power source 10' by releasing or absorbing energy. In some embodiments, the system may the system 920 may be configured to concurrently provide mechanical power to the hydraulic motor 923 from the power source 10' and the engine 925. A control circuit 931 may control the interface circuit 921, generator 922, coupling mechanism 924, engine 925, valves 926, 932 and motor 929.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
   an uninterruptible power supply (UPS) comprising an inverter configured to selectively supply power to a load from an energy storage device;
   a generator configured to be coupled to a power input of the UPS;
   an engine;
   a hydraulic motor;
   a mechanical coupling mechanism configured to selectively couple the engine and the hydraulic motor to the generator;
   a hydraulic accumulator;
   a valve configured to fluidically couple the hydraulic accumulator to the hydraulic motor; and
   a control circuit configured to control the valve, the mechanical coupling mechanism and the engine in conjunction with the UPS to supply power to the UPS.

2. The system of claim 1, wherein the control circuit is configured to selectively drive the generator using the hydraulic accumulator and the engine responsive to a status of a power source coupled to the UPS.

3. The system of claim 2, wherein the control circuit is configured to sequentially drive the generator using the hydraulic accumulator and the engine responsive to a failure of the power source.

4. The system of claim 2, wherein the control circuit is configured to cause the hydraulic motor to drive the engine.

5. The system of claim 1, wherein the mechanical coupling mechanism comprises at least one clutch controlled by the control circuit.

6. The system of claim 1, wherein the generator comprises a reversible motor/generator, wherein the hydraulic pump comprises a reversible motor/pump, and wherein the control circuit is configured operate the motor/generator and the motor/pump to charge the hydraulic accumulator.

7. The system of claim 1, wherein the energy storage device comprises a battery or a capacitor.

8. The system of claim 1, wherein the generator is configured to provide power to a DC power input of the UPS.

9. A power supply system comprising:
   a UPS comprising an inverter configured to selectively supply power to a load from an energy storage device; and
   an electrohydraulic generator system coupled to a power input of the UPS, comprising an engine and a hydraulic accumulator and configured to selectively provide power to the UPS from the engine and the hydraulic accumulator responsive to a state of the UPS.

10. The power supply system of claim 9, wherein the electrohydraulic generator system comprises:
    a generator coupled to the power input of the UPS;
    a hydraulic motor;
    a mechanical coupling mechanism configured to selectively mechanically couple the engine and the hydraulic motor to the generator;
    a valve configured to fluidically couple the hydraulic accumulator to the hydraulic motor; and
    a control circuit configured to control the valve, the mechanical coupling mechanism and the engine in conjunction with the UPS to supply power to the UPS.

11. The power supply system of claim 10, wherein the control circuit is configured to selectively drive the generator using the hydraulic accumulator and the engine responsive to a status of a power source coupled to the UPS.

12. The power supply system of claim 11, wherein the control circuit is configured to sequentially drive the generator using the hydraulic accumulator and the engine responsive to a failure of the power source.

13. The power supply system of claim 10, wherein the control circuit is configured to cause the hydraulic motor to drive the engine.

14. The power supply system of claim 10, wherein the mechanical coupling mechanism comprises at least one clutch controlled by the control circuit.

15. The power supply system of claim 10, wherein the generator comprises a reversible motor/generator, wherein the hydraulic pump comprises a reversible motor/pump, and wherein the control circuit is configured operate the motor/generator and the motor/pump to charge the hydraulic accumulator.

16. The power supply system of claim 9, wherein the electrohydraulic generator system is configured to selectively provide power to the UPS from the engine and the hydraulic accumulator responsive to a state of a power source coupled to the UPS.

17. The power supply system of claim 9, wherein the power input comprises an AC input or a DC input.

18. The power supply system of claim 9, wherein the energy storage device comprises a battery or a capacitor.

19. The power supply system of claim 9, wherein the electrohydraulic generator system is coupled to an AC power input of the UPS or to a DC power input of the UPS.

20. A method of operating a power supply system, the method comprising:
providing power to a load from a primary power source via a UPS comprising an inverter configured to selectively supply power to the load from an energy storage device; and
selectively providing power to the load from an engine and a hydraulic accumulator via the UPS responsive to a state of the UPS.

21. The method of claim 20, wherein selectively providing power to the load from an engine and a hydraulic accumulator via the UPS responsive to a state of the UPS comprises selectively providing power to the load from the engine and the hydraulic accumulator responsive to a state of the primary power source.

22. The power supply system of claim 20, wherein selectively providing power to the load from an engine and a hydraulic accumulator via the UPS responsive to a state of the UPS comprises selectively driving a generator coupled to the UPS using the hydraulic accumulator and the engine.

* * * * *